June 5, 1962 R. G. CRADDOCK ET AL 3,037,831
TABLE AND LEG LOCKING STRUCTURE
Filed Aug. 24, 1959 3 Sheets-Sheet 1

INVENTORS.
RONALD G. CRADDOCK
MARVIN M. KING
BY Robert A. Sloman
ATTORNEY

INVENTORS.
RONALD G. CRADDOCK
BY MARVIN M. KING

Robert A. Sloman
ATTORNEY

June 5, 1962

R. G. CRADDOCK ET AL 3,037,831

TABLE AND LEG LOCKING STRUCTURE

Filed Aug. 24, 1959

INVENTORS.
RONALD G. CRADDOCK
BY MARVIN M. KING

Robert A. Sloman
ATTORNEY

United States Patent Office 3,037,831
Patented June 5, 1962

3,037,831
TABLE AND LEG LOCKING STRUCTURE
Ronald G. Craddock, Taylor, and Marvin M. King, Oak Park, Mich., assignors to Shwayder Brothers, Inc., Ecorse, Mich., a corporation of Colorado
Filed Aug. 24, 1959, Ser. No. 835,775
6 Claims. (Cl. 311—99)

This invention relates to a table with pivotal legs, and more particularly to a novel table and leg mounting construction.

It is an object of the present invention to provide a novel leg mounting assembly including mounting bracket, locking bracket and locking collar mechanism whereby the respective legs are fixedly retained in open position and may be easily released for collapsing into storage position.

It is another object to provide a novel leg mounting for a table wherein the pivotally mounted legs when open tilt outwardly approximately 5 degrees from normal position to provide a more rigid table support.

It is another object to provide a novel interlock between the pivotal leg and the mounted bracket therefore whereby the leg is fixedly locked in open position, but may be manually disengaged to facilitate pivotal collapse of the leg substantially within the plane of the table top.

It is a further object to provide a novel table top assembly and tubular frame including a protective resilient beading therebetween which projects laterally of the periphery of said top and frame.

It is a further object to provide a novel table top and frame assembly.

These and other objects will be seen from the following specification and claims in conjunction with the appended drawings in which:

It will be understood that the above drawings illustrate merely a preferred embodiment of the invention and that other embodiments are contemplated within the scope of the claims hereafter set forth.

Figure 1:
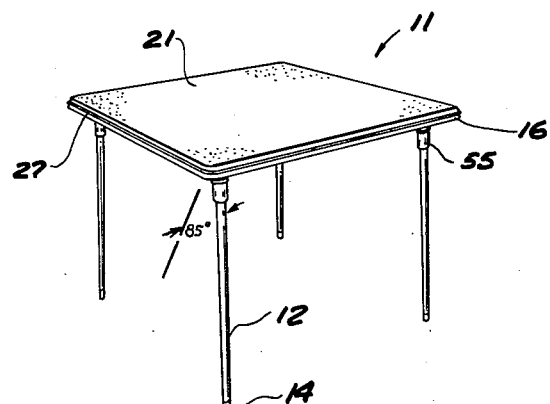
FIG. 1 is a perspective view of the present table.

Referring to the drawings, the complete table is shown in FIG. 1, including table top 11 with pivotal tubular steel legs 12 tapered downwardly and inwardly towards their lower ends.

Figure 8:
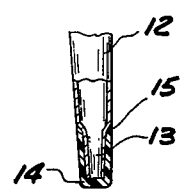
FIG. 8 is a fragmentary partially broken away and sectioned view on an enlarged scale of the lower portion of the leg and assembled cap.

The lower end of each leg is spun or formed of a reduced diameter as at 13, FIG. 8, and has cooperatively and snugly protected thereover the preferably plastic leg cap 14, whose outer diameter at its upper end corresponds with the adjacent diameter of the tapered leg as a smooth continuation thereof.

Figure 9:
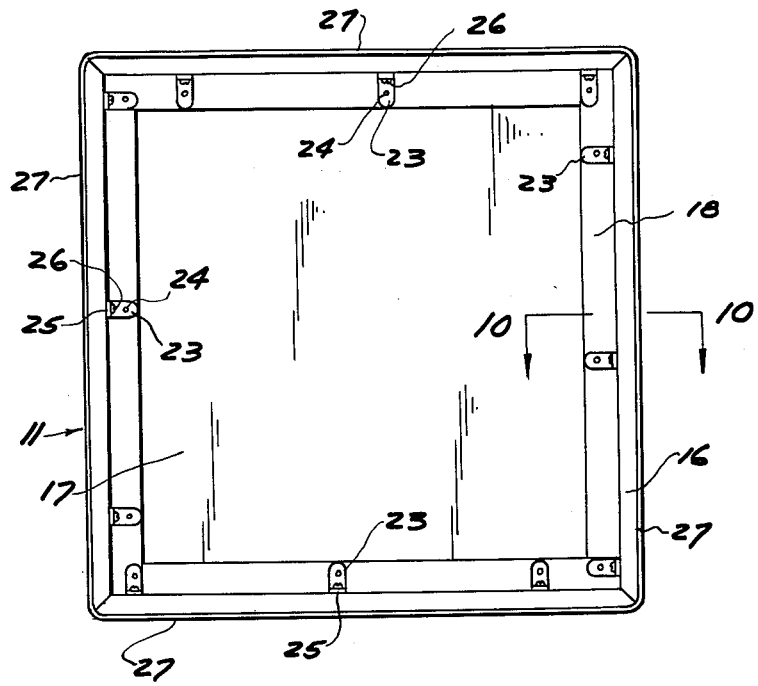
FIG. 9 is a bottom plan view of the table top and frame assembly.

Table top 11 includes the hollow continuous metallic tubular frame 16, which is preferably of square cross section, with slightly rounded corners and edges and which is assembled as the rigid unitary structure as shown in FIG. 9.

Figure 10:
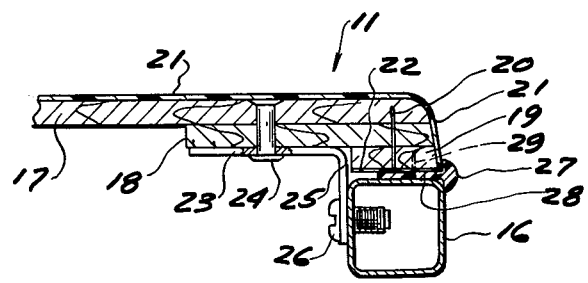
FIG. 10 is a section taken on line 10—10 of FIG. 9, but with the table inverted to normal position for clarity of illustration.

The table top includes the rectangular hardboard 17 with rounded margin and tapered edge. Upon the undersurface thereof along all four sides are the hardboard strips 18. Additional narrow hardboard strips 19 extend around the outer margin of the respective strips 18, with all strips secured together with a series of fasteners such as nails 20 or the like, FIG. 10.

The table top also includes a plastic cover 21, preferably of vinyl which is stretched across hardboard 17 and downwardly around its periphery along the edges of strips 18 and 19 with marginal portions 22 underlying and secured to strip 19 as by cement or suitable fastener.

A series of clips 23 are spaced longitudinally adjacent the respective edges of the assembled hardboard elements 17—18 and secured thereto by rivets 24. Clips 23 terminate in the right angular flanges 25 which project within the tubular hollow frame 16 and cooperatively engages its interior upright surface. Fasteners 26, such as sheet metal screws, project through flanges 25 and threadedly extend through corresponding preformed apertures in frame 16. Thus the table top is fixedly secured to the unitary preferably steel tubular frame 16.

The table top assembly also includes resilient marginal beading 27 which extends peripherally around and extends laterally of the lower edge of the table top assembly and adjacent the top edge of frame 16. Bead 27 is preferably of plastic or rubber and is formed as an extrusion of T-shape in cross section, including the elongated continuous flange 28 which is projected under and along the outer margin of table top strip 19 and is fixedly secured thereto as by cement or by the staples 29, FIG. 10.

Alternately flange 28 may be cemented to the top surface of tubular frame 16. The resilient beading 27 provides a protective edging for the table top, particularly when the collapsed table is standing upon one of its sides as shown in FIG. 4.

Within each of the corners of frame 16 as viewed from its undersurface there is fixedly secured a mounting bracket 30, preferably constructed of steel, including bottom wall 31 with reinforcing corrugation 32.

Said mounting bracket also includes marginal right angular flange 33 which is continuous around its periphery with respective right angularly related upright end walls 34 cooperatively engaging interior corner portions of frame 16 and fixedly secured thereto by welds 35.

Figure 2:
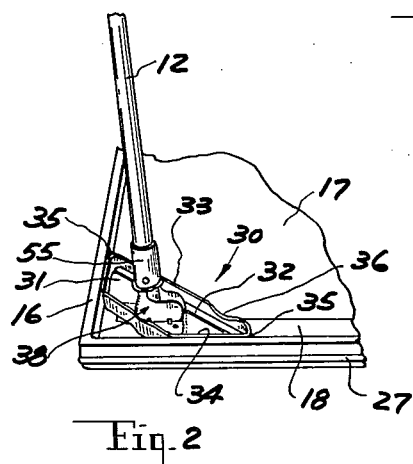
FIG. 2 is a fragmentary perspective view of a corner of the table inverted, fragmentarily illustrating the leg mounting in open position.
Figure 4:
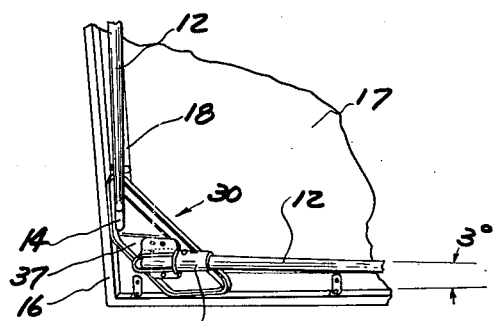
FIG. 4 is a fragmentary view of the corner of the table from its interior when resting on one side, showing a pair of legs in closed position.

An inner portion of flange 33 is depressed at 36 providing clearance to receive the leg assembly when pivoted to the closed position shown in FIG. 4. Upon the interior of mounting bracket 30 and forming a part of bottom plate 31 there is provided a raised boss 37 whose top surface is tapered angularly outward lying in a plane at an angle of approximately 5 degrees to a plane passing through bottom plate 31. In other words the top flat surface of boss 37 is tipped outwardly towards the adjacent corner of frame 16, being of less height towards the respective corner whereby the assembled leg hereafter described will normally cant outwardly approximately 5 degrees from the normal as shown in FIGS. 1 and 2.

Mounted upon the flat tapered surface of boss 37 are the outwardly projecting flanges 40 of locking bracket 38, being secured to the boss 37 by a plurality of rivets 41. Said locking bracket includes the upright parallel spaced guide walls 39 which terminate at their lower ends in the above mounting flanges 40. Side walls 39 at their rear terminate in the substantially semi-circular end wall 42 which is upright for a portion of its height. Welding may replace rivets 41.

Figure 5:
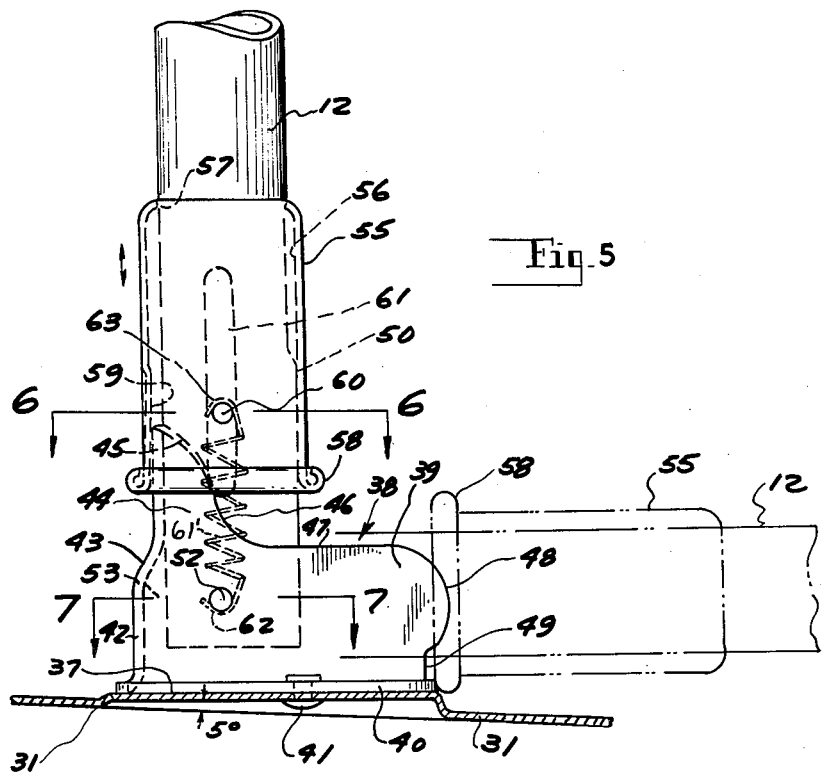
FIG. 5 is a fragmentary section of the leg mounting bracket, locking bracket, locking collar and leg assembly, on an enlarged scale.

As shown in FIG. 5, the upper portion of wall 42 extends angularly inward at 43 and then merges with the upright arcuate end wall stop 44. Stop 44 is substantially semi-circular across its top as at 45 with its forwardly extending side portions curving downwardly at 46 and merging with the horizontal top walls 47 of upright leg guides 39. Said guides have curved forwardly projecting bosses 48 on their ends which terminate in the inwardly positioned notched upright wall portions 49 adjacent their lower ends.

Figure 7:
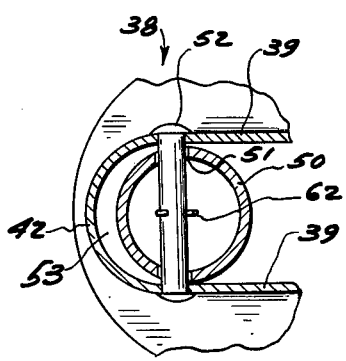
FIG. 7 is a fragmentary section taken on line 7—7 of FIG. 5.

The tapered tubular leg 12 at its upper end, being shown as the lower end in FIG. 5, has an enlargement 50 of slightly increased diameter which extends between upright guides 39 of the locking bracket and is pivotally mounted thereon by the transverse pivot pin or rivet 52 secured transversely across the locking bracket, loosely extending through apertures 51, FIG. 7, adjacent the end of leg enlargement 50.

Figure 3:
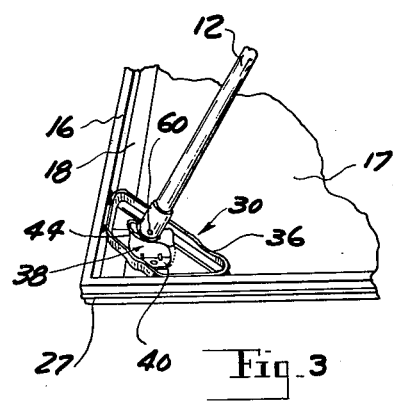
FIG. 3 is a similar view showing a leg partly closed.

As viewed in FIGS. 5 and 7 there is provided a clearance space 53 to the left of the lower end of said leg adapted to cooperatively receive the lower corner of said leg enlargement as said leg is pivoted from the position shown in FIG. 5 through the position of FIG. 3, to the collapsed position of FIG. 4.

In the upright position shown in FIG. 5 portions of leg enlargement 50 are supportably engaged by interior wall 54 of arcuate end wall stop 44 which forms the upper portion of locking bracket 38 to thus determine the upright position of leg 12 locating the same within said locking bracket.

Locking collar 55 with internal bore 56 is loosely positioned over the undersized end portion of leg 12, and includes the inwardly directed tapered annular flange 57 which cooperatively yet loosely and slidably engages leg 12.

Enlargement 50 cooperatively engages bore 56 of collar 55 towards the lower end thereof, as shown in FIG. 5. At the same time the locking collar at its lower end overlies and cooperatively engages arcuate end wall stop 44 on the upper portion of locking bracket 38 for the purpose of retaining leg 12—50 in the substantially upright position shown.

An elongated downwardly and outwardly tapered boss 59 is formed upon the interior of collar 55 upon one side thereof with the taper increasing inwardly from a minimum at the lower end of the collar so as to snugly and cooperatively engage arcuate stop 44 when collar 55 is in the leg locking position shown.

Figure 6:
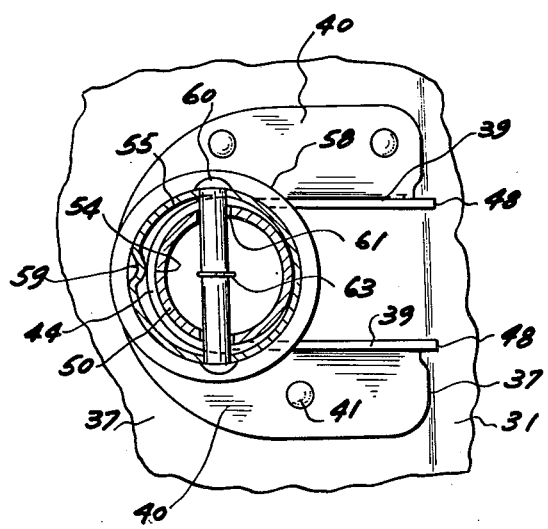
FIG. 6 is a fragmentary section taken on line 6—6 of FIG. 5.

Transverse rivet or pin 60 loosely and slidably extends through the elongated slots 61 formed in opposing walls of leg enlargement 50 and adjacent leg 12 with the ends of said pin extending through adjacent walls of collar 55 and secured thereto as indicated in FIG. 6.

Pin 60 thus serves as a guide pin for manual or other longitudinal adjustments of locking collar 55 relative to leg 12 and stop 44, and prevents rotation thereof. Coil spring 61' is loosely positioned within leg enlargement 50 and at one end extends around and is anchored to leg pivot pin 52 as at 62, FIG. 7, and at its opposite end extends around and is secured to collar guide pin 60 as at 63.

The spring normally urges locking collar 55 under compression into the locking position shown and the corresponding locking position shown in FIG. 1. Thus the collar 55 may not drop into release position. There is thus provided an effective locking means for securing the leg 12 in the open position shown.

To release the leg for folding to the collapsed position shown in dotted lines in FIG. 5 or as shown in FIG. 4, collar 55 is manually slid longitudinally away from the leg pivot pin after which leg 12 may be pivoted from the position shown in FIG. 2 to the dotted line collapsed position in FIGS. 4 or 5.

Just as soon as collar 55 passes the top outer edges of stop 44 it may be manually released. Its lower rolled flange 58 cooperatively cams against the respective curved surfaces 45—46 of the locking bracket as shown in the intermediate position, FIG. 3. At that position the top edges 47 cooperatively cam against collar 55 against the action of spring 61 so that the lower end 58 of said collar rides along the curved end 48 of the respective bracket walls 39 until said collar assumes the dotted line position of FIG. 5, and wherein the enlarged end portion 58 of said collar is retainingly engaged in notch 49 on the locking bracket with the forwardly projecting bosses 48 retaining the folding leg assembly in the collapsed position shown.

While the locking bracket thus serves to anchor the respective leg in folded position, the cam action of the bosses 48, FIG. 5 is such that manual thrust upon the leg 12 is all that is necessary acting against spring 61' for rotating the leg to the fully open position shown in FIG. 5.

During this procedure the enlarged annular edge 58 of collar 55 cams against the respective edge surfaces 48, 47, 46, 45 of locking bracket 39. When the locking collar reaches the full open position shown in FIG. 5, with leg 12 engaging stop 44, it automatically snaps into locking position under the action of coil spring 61' for instantly securing the opened leg in the position shown in FIGS. 1 and 5.

As shown in FIG. 4, the diagonally outward taper of boss 37 which mounts locking bracket 38 is such that when leg 12 is folded against the table top, it extends at a slight angle of approximately 3 degrees with respect to the interior wall of the table frame.

Having described our invention, reference should now be had to the following claims:

We claim:

1. In a table having a frame, a leg mounting bracket secured upon the undersurface thereof and within each of its corners, a locking bracket secured thereto and depending therefrom, including a pair of parallel spaced guide walls and an arcuate end wall extending below said guide walls, a leg substantially normal to said frame with one end projected into said locking bracket engaging said guide walls and pivotally mounted thereon, said arcuate end wall retainingly engaging said leg inwardly of its pivotal mounting, a locking collar slidably mounted on said leg with one end of said collar retainingly positioned over the end of said arcuate end wall immovably securing said leg to said locking bracket, said leg mounting bracket including a bottom wall, and a boss projecting below said wall having a flattened surface extending in a plane at a small acute angle to the plane of said bottom wall, said boss supportably mounting said locking bracket, the plane of the flattened surface of said boss extending upwardly and towards the adjacent corner of the frame.

2. In a table having a frame, a leg mounting bracket secured upon the undersurface thereof and within each of its corners, a locking bracket secured thereto and depending therefrom, including a pair of parallel spaced guide walls and an arcuate end wall extending below said guide walls, a leg substantially normal to said frame with one end projected into said locking bracket engaging said guide walls and pivotally mounted thereon, said arcuate end wall retainingly engaging said leg inwardly of its pivotal mounting, a locking collar slidably mounted on said leg with one end of said collar retainingly positioned over the end of said arcuate end wall immovably securing said leg to said locking bracket, spring means interconnecting said collar and said pivotal mounting under tension, the opposing upper edges of said arcuate end wall curving downwardly and outwardly merging with the top edges of said guide walls, one end of said locking collar upon disengagement from said arcuate end wall camming successively against the edges of said arcuate end wall and guide walls as said leg is rotated from open position to collapsed position, and undercut laterally extending arcuate locking bosses on the forward ends of said guide walls, one end of said collar interlockingly engaging said bosses when in collapsed position for maintaining the leg within said frame.

3. In the table of claim 1, the pivotal end of said leg having an enlargement upon one side, said locking collar on one side adjacent one end snugly engaging said enlargement with said arcuate end wall interposed between the opposite sides of said leg and collar, respectively, the opposite end of said collar loosely positioned over said leg and including an inwardly directed annular flange cooperatively and slidably engaging said leg.

4. In the table of claim 1, a tapered longitudinally extending boss projecting inwardly of the interior of said locking collar of increasing height towards the center of said collar for cooperative wedging engagement with one side of said arcuate end wall for fixedly securing the leg against the opposite side of said arcuate end wall.

5. In the table of claim 6, manual rotation of a leg from collapsed position causing a camming and disengaging action of said collar from said locking boss, one end of said collar camming successively against the top edges of said guide walls and edges of said arcuate end wall, said collar resiliently and automatically snapping into locking position on rotation of the leg into longitudinal registry with said arcuate end wall.

6. In a table having a frame, a locking bracket secured within each of its corners and depending therefrom, including a pair of parallel spaced guide walls and an arcuate end wall extending below said guide walls, a leg substantially normal to said frame with one end projected into said locking bracket engaging said guide walls and pivotally mounted thereon, said arcuate end wall retainingly engaging said leg inwardly of its pivotal mounting, a locking collar slidably mounted on said leg with one end of said collar retainingly positioned over the end of said arcuate end wall immovably securing said leg to said locking bracket, spring means interconnecting said collar and said pivotal mounting under tension, the opposing upper edges of said arcuate end wall curving downwardly and outwardly and merging with the top edges of said guide walls, one end of said locking collar upon disengagement from said arcuate end wall camming successively against the edges of said arcuate end wall and guide walls as said leg is rotated from open position to collapsed position, and an undercut laterally extending arcuate locking boss on the forward end of at least one of said guide walls, one end of said collar interlockingly engaging said boss when in collapsed position for maintaining the leg within said frame.

References Cited in the file of this patent

UNITED STATES PATENTS

| | | |
|---|---|---|
| 1,809,564 | O'Connor et al. | June 9, 1931 |
| 1,855,857 | Harman | Apr. 26, 1932 |
| 1,876,010 | Kusterle | Sept. 6, 1932 |
| 1,910,974 | Vance | May 23, 1933 |
| 2,425,162 | Overbey | Aug. 5, 1947 |
| 2,574,592 | Schaffer | Mar. 13, 1951 |
| 2,646,327 | Saaf | July 21, 1953 |
| 2,719,068 | Adler | Sept. 27, 1955 |
| 2,773,726 | Johansson et al. | Dec. 11, 1956 |
| 2,868,601 | Hamilton | Jan. 13, 1959 |